United States Patent
Talbot et al.

(10) Patent No.: US 6,516,373 B1
(45) Date of Patent: Feb. 4, 2003

(54) COMMON MOTHERBOARD INTERFACE FOR PROCESSOR MODULES OF MULTIPLE ARCHITECTURES

(75) Inventors: Gerald Talbot, Concord, MA (US); Hanwoo Cho, Concord, MA (US); Eric Rowe, Natick, MA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/335,954

(22) Filed: Jun. 18, 1999

(51) Int. Cl.[7] .............................................. G06F 13/00
(52) U.S. Cl. ...................................... 710/301; 710/104
(58) Field of Search ................................ 710/300, 301, 710/302, 104

(56) References Cited

U.S. PATENT DOCUMENTS

| | | |
|---|---|---|
| 5,428,806 A | 6/1995 | Pocrass |
| 5,625,802 A | 4/1997 | Cho et al. |
| 5,761,479 A * | 6/1998 | Huang et al. ................ 710/301 |
| 5,839,584 A | 11/1998 | Gonzalves et al. ...... 211/41.17 |
| 5,848,250 A * | 12/1998 | Smith et al. ................ 710/301 |
| 5,862,351 A * | 1/1999 | He ............................ 710/104 |
| 5,884,091 A * | 3/1999 | Ghori et al. ................ 710/301 |
| 5,918,023 A * | 6/1999 | Reeves et al. .............. 710/301 |
| 5,983,297 A * | 11/1999 | Noble et al. ................ 710/312 |
| 6,052,794 A * | 4/2000 | Polzin et al. .................. 713/1 |

FOREIGN PATENT DOCUMENTS

EP 0 574 991 A1 6/1993 ........... G06F/13/40

* cited by examiner

*Primary Examiner*—Glenn A. Auve
(74) *Attorney, Agent, or Firm*—Mills & Onello, LLP

(57) ABSTRACT

A common motherboard interface accommodates processor modules of different processor architectures. The system comprises an interface for communicating with a processor module inserted at the motherboard. The interface receives an identifier signal from the processor module. The identifier signal identifies the processor module architecture. An architecture selection circuit selectively exchanges processor architecture specific signals with the processor module based on the identifier signal. In this manner, a multiple of processor modules of completely different processor architectures can share a common motherboard, thereby providing a system that can be field-upgraded by processor modules of different architectures, or simply allowing the same motherboard to be employed in two different products of different processor architectures.

24 Claims, 3 Drawing Sheets

COMMON MOTHERBOARD INTERFACE FOR PROCESSOR MODULES OF MULTIPLE ARCHITECTURES

BACKGROUND OF THE INVENTION

Processor modules have become popular in recent years as a means for providing reliable and efficient computer system upgrades. In a processor module, a processor is mounted to a circuit panel containing electrical interconnection paths, for example a printed circuit board, along with support electronics, for example random access memory (RAM) in the form of processor cache. Module electronics communicate with electronics mounted to a computer motherboard via an interface in the form of a high-speed connector. Ideally, as system clock rates increase, and processor functions evolve, the outdated processor module assembly can be removed from the motherboard at its connector and replaced by an upgraded module capable of operating at the higher rate, and/or with improved functionality.

While some contemporary systems allow for an upgrade or replacement by a processor module within a same processor family, or having the same processor architecture, as the original, such systems do not accommodate replacement by a processor module from a different processor family, or different architecture.

SUMMARY OF THE INVENTION

The present invention is directed to a motherboard interface for a processor module that accommodates processors of different processor architectures sharing a common high-speed system bus architecture. In this manner, an interface is provided such that a processor module including a processor of a first architecture, for example the x86™ family of processors produced by AMD Corp., can be replaced by a processor module including a processor of a second, and distinct, architecture, for example the Alpha™ family of processors produced by Compaq Computer Corp. The present invention thus allows a multiple of completely different processor architectures to share a common motherboard, thereby providing a system that can be field-upgraded by processor modules of different architectures, or to simply allow the same motherboard to be employed in two different products of different processor architectures.

The present invention comprises a system for a motherboard adapted for interfacing with processor modules of a plurality of different processor architectures. The system comprises an interface for communicating with a processor module inserted at the motherboard. The interface receives an identifier signal from the processor module. The identifier signal identifies the processor module architecture. An architecture selection circuit selectively exchanges processor architecture specific signals with the processor module based on the identifier signal.

In a preferred embodiment, the interface comprises a connector for exchanging signals between the motherboard and processor module. The interface further communicates processor architecture specific signals and processor architecture common signals.

The architecture selection circuit may comprise a multiplexer bank for outputting one of a plurality of processor architecture specific signals to the interface selected by the identifier signal. The architecture selection circuit may further comprise a demultiplexer bank for inputting one of a plurality of processor architecture specific signals from the interface selected by the identifier signal.

The system may further comprise an initialization memory bank comprising processor architecture specific data stored in memory, the data being selected based on the identifier signal. The memory preferably comprises processor architecture specific BIOS ROM. The processor architecture specific data is preferably transferred to the processor module via processor common signals on the interface.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
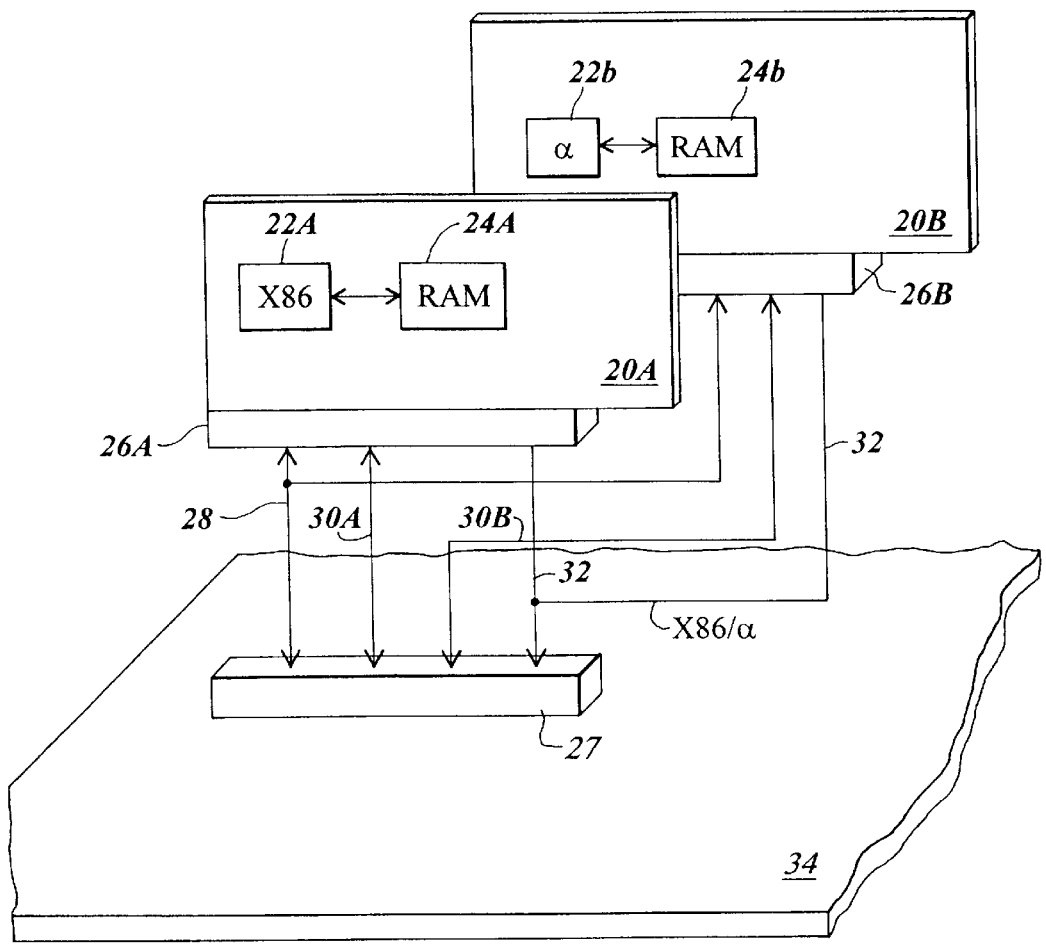
FIG. 1 is a perspective view of an interface between a motherboard and processor module that allows for automated recognition of a processor on the module independent of the processor family in accordance with the present invention.

FIG. 1 is a perspective view of an interface between a motherboard 34 and one of a plurality of processor modules 20A, 20B. The motherboard 34 includes a connector 27 for communicating with the processor modules 20A, 20B. The processor modules 20A, 20B are of different processor architectures, and include processors 22A, 22B from different processor families. As an example, processor 22A may comprise a processor from the x86™ family of processors produced by AMD Corp., while processor 22B may be of the Alpha™ family of processors produced by Compaq Computer Corp. Similarly, memory 24A, 24B, for example in the form of off-chip cache-RAM, are likewise mounted to the processor modules 20A, 20B and may be specifically adapted for use with each respective family of processors. Connectors 26A, 26B are further provided for interfacing with the motherboard connector 27.

The present invention allows for either of the processor modules 20A, 20B to be mounted to the motherboard 34 at connector 27 and for the motherboard 34 electronics to automatically recognize the type of processor module and communicate directly with either processor 22A, 22B. The processor architecture is identified by an architecture identifier signal 32 which is hard-wired or otherwise stored in memory, for example in ROM, on the processor module 20A, 20B and provided to the motherboard electronics 34 via connector 27. As an example, an x86™ family of processors may be indicated on line 32 by a binary zero, while an Alpha™ processor type may be indicated by a binary one. Additional lines, or encoding via serial transfer, are also possible to provide additional data to the motherboard 34 regarding the processor architecture, as needed. For example, the motherboard 34 may be configured to receive third or fourth family processor types, or processors of various generations within each family. In these cases, additional information can be provided via line 32. A technique for transferring processor module information is disclosed in U.S. patent application Ser. No. 09/335,939, filed Jun. 18, 1999, entitled "Dynamic Initialization of Processor Module via Motherboard Interface", by Gerry Talbot et al., incorporated herein by reference.

Ideally, processor modules of different architectures have a number of signals, for example address, data, and control signals, that are shared in common among the architectures. These common signals, referred to herein as "processor architecture common signals", are represented by the common line 28 in FIG. 1, and are provided directly to the motherboard 34 through connector 27. As an example, if both processors from different families 22A, 22B have a data bus of common nature, the bus bits can be provided directly from the motherboard 34 to connector 27 and exchanged directly with the processor modules 20A, 20B regardless of the type of module inserted.

The processors may also contain a number of signals that are unique to each processor. Such unique signals, referred to herein as "processor architecture specific signals", are represented in FIG. 1 by line 30A, for processor module 20A, and line 30B for processor module 20B. Such signals may involve particular interrupt protocols or control signals specific to each processor that operate according to unique protocols, and therefore are not in common among the processor modules 20A, 20B.

Figure 2:
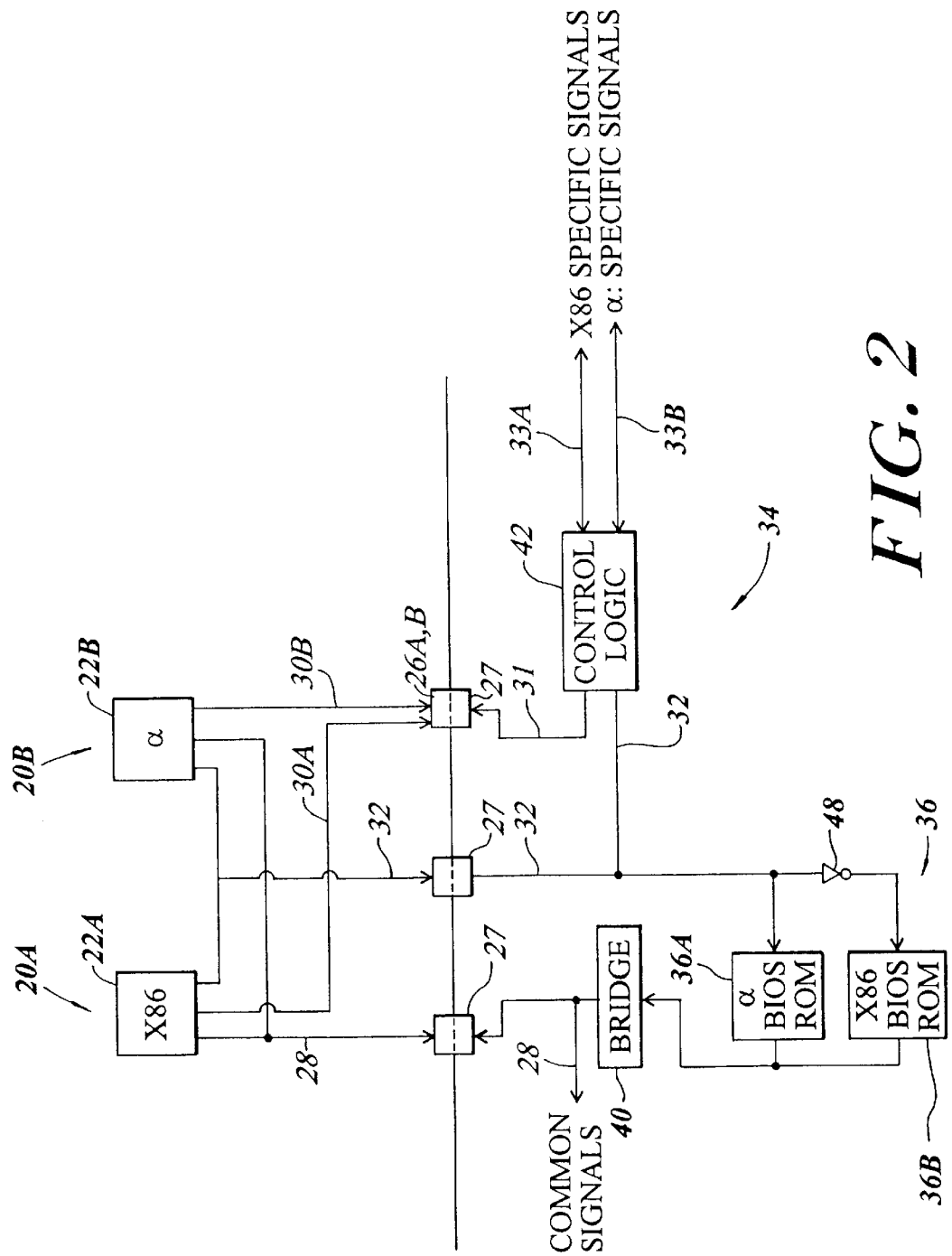
FIG. 2 is a block diagram of the interface of FIG. 1 in accordance with the present invention.

FIG. 2 is a schematic block diagram of the interface of FIG. 1. In FIG. 2, it can be seen that the processor architecture identifier signal 32 is transferred through connectors 26, 27 into the motherboard 34 where it is input to control logic 42 and employed, for example as a selector bit. In a more sophisticated embodiment, where the processor type indicator signal 32 involves an encoded signal, it may first be decoded by decoding circuitry on the motherboard 34 and passed to control logic 42.

At the control logic 42, x86-specific signals 33A are provided, along with Alpha-specific signals 33B. These processor architecture specific signals could optionally be provided directly to the connector 27 and selectively received by the corresponding connector 26A, 26B for the particular processor 22A, 22B; however, in order to reduce pin count at the connectors 26, 27 the processor architecture specific signals 33A, 33B are multiplexed by the control logic 42 into a single set of contacts at connector 27 via line 31.

Figure 3:
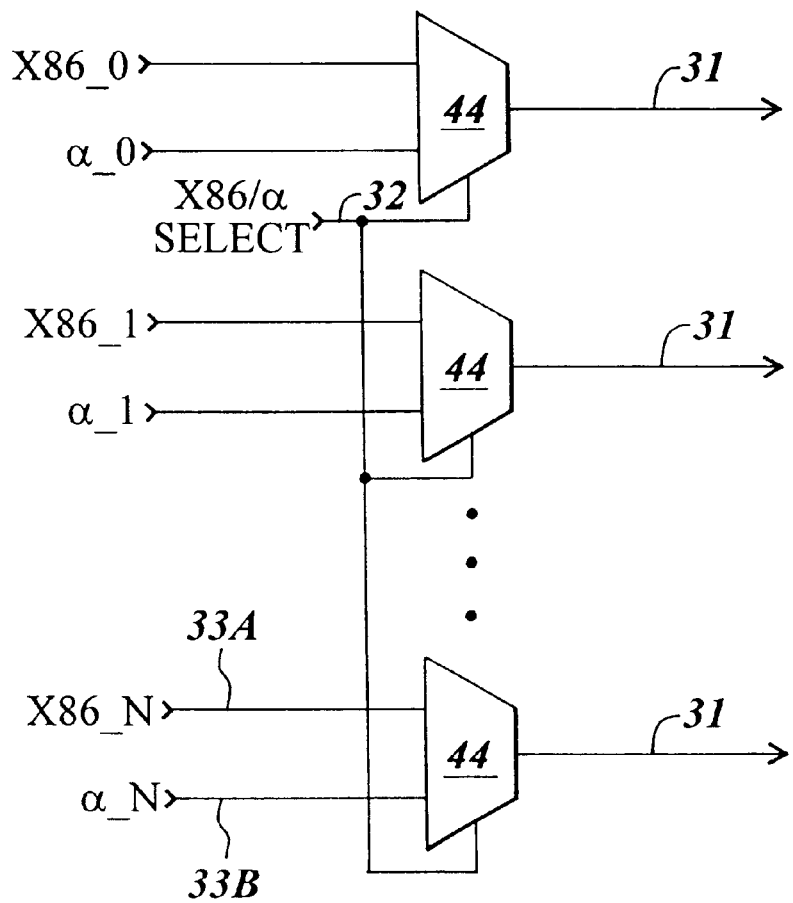
FIG. 3 is a schematic circuit diagram of an exemplary circuit for the control logic of FIG. 2 in accordance with the present invention.

FIG. 3 is a schematic diagram illustrating the use of the processor architecture identifier signal 32 as a selection signal for multiplexing the processor architecture specific signals 33A, 33B. A number of x86™ processor specific signals x86_0 . . . x86-N are provided as first inputs to the multiplexer bank 44. Similarly, a number of Alpha™ processor specific signals Alpha_0 . . . Alpha_N are provided as second inputs to the multiplexer bank 44. The processor architecture identifier signal 32 is used as a selector signal by the multiplexers 44 to determine which of the two input signals in the multiplexer bank are connected to line 31 and transferred to connector 27. In similar fashion, signals input from line 31 to the control logic 42 can be demultiplexed and provided to processor-specific hardware via lines 33A, 33B based on the identifier signal 32 used as a demultiplexer selection bit. In many situations there will not be an equal number of processor-specific signals to be transferred for each architecture. In this case, the excess signals can be transferred directly to the connector 27 without first passing through the control logic 42.

The processor architecture identifier signal 32 is further distributed to a memory bank 36, for example comprising Basic Input/Output System (BIOS) ROM for the Alpha™ 36A and x86™ 36B processors. In the example given, the processor architecture identifier signal 32 is a single bit and therefore an inverter 48 is included to invert the signal as a selection signal for the x86™ BIOS ROM. In this manner, one of the two ROM units 36 is activated. During initialization of the processor, the initialization program is transferred out of the activated ROM 36 and provided to bridge 40 which performs a standard operation for converting the data from a ROM bus format to a format consistent with the processor bus, for example PCI bus format. From the bridge 40, the BIOS ROM signals are transmitted through connector 27 to the processor 22A or 22B via common lines 28. As shown in FIG. 2, any signals common to both processors 22A, 22B are preferably distributed on the motherboard 34 without first passing through the control logic 42.

In this manner, the present invention allows for the configuration of a single motherboard 34 to be compatible with multiple processor architectures, the unique processor architectures being interchangeable and both operable on a common motherboard 34.

While this invention has been particularly shown and described with reference to preferred embodiments thereof, it will be understood by those skilled in the art that various changes in form and in detail may be made therein without departing from the spirit and scope of the invention as defined by the appended claims.

For example, while the above description describes the use of two families of processors of unique architectures, specifically the Alpha™ family and x86™ family of processors, as being compatible with the common motherboard 34, the utility of the motherboard can be extended beyond the two families of processors to include additional families and additional generations of processors within particular families.

We claim:

1. A system for a motherboard adapted for interfacing with processor modules of a plurality of different processor architectures comprising:

an interface for communicating with a processor module inserted at the motherboard; said interface receiving an identifier signal from the processor module, said identifier signal identifying the processor module architecture; and an architecture selection circuit for selectively exchanging processor architecture specific signals with the processor module based on the identifier signal, wherein the architecture selection circuit comprises a multiplexer bank for outputting one of a plurality of processor architecture specific signals to the interface selected by the identifier signal.

2. The system of claim 1 wherein the interface comprises a connector for exchanging signals between the motherboard and processor module.

3. The system of claim 1 wherein the interface further communicates processor architecture specific signals and processor architecture common signals.

4. The system of claim 1 wherein the system further comprises an initialization memory bank comprising processor architecture specific data stored in memory, said data being selected based on the identifier signal.

5. The system of claim 4 wherein the memory comprises processor architecture specific BIOS ROM.

6. The system of claim 4 wherein the processor architecture specific data is transferred to the processor module via processor common signals on said interface.

7. A system for a motherboard adapted for interfacing with processor modules of a plurality of different processor architectures comprising:

an interface for communicating with a processor module inserted at the motherboard; said interface receiving an identifier signal from the processor module, said identifier signal identifying the processor module architecture; and an architecture selection circuit for selectively exchanging processor architecture specific signals with the processor module based on the identifier signal, wherein the architecture selection circuit comprises a demultiplexer bank for inputting one of a plurality of processor architecture specific signals from the interface selected by the identifier signal.

8. The system of claim 7 wherein the interface comprises a connector for exchanging signals between the motherboard and processor module.

9. The system of claim 7 wherein the interface further communicates processor architecture specific signals and processor architecture common signals.

10. The system of claim 7 wherein the system further comprises an initialization memory bank comprising processor architecture specific data stored in memory, said data being selected based on the identifier signal.

11. The system of claim 10 wherein the memory comprises processor architecture specific BIOS ROM.

12. The system of claim 10 wherein the processor architecture specific data is transferred to the processor module via processor common signals on said interface.

13. A system for a motherboard adapted for interfacing with processor modules of a plurality of different processor architectures comprising:

an interface for communicating with a processor module inserted at the motherboard; said interface receiving an identifier signal from the processor module on at least one identifier signal interconnect line, said identifier signal identifying the processor module architecture; and an architecture selection circuit for selectively exchanging processor architecture specific signals with the processor module based on the identifier signal, wherein the architecture selection circuit comprises a multiplexer bank for outputting one of a plurality of processor architecture specific signals to the interface selected by the identifier signal.

14. The system of claim 13 wherein the interface comprises a connector for exchanging signals between the motherboard and processor module.

15. The system of claim 13 wherein the interface further communicates processor architecture specific signals and processor architecture common signals.

16. The system of claim 13 wherein the system further comprises an initialization memory bank comprising processor architecture specific data stored in memory, said data being selected based on the identifier signal.

17. The system of claim 16 wherein the memory comprises processor architecture specific BIOS ROM.

18. The system of claim 16 wherein the processor architecture specific data is transferred to the processor module via processor common signals on said interface.

19. A system for a motherboard adapted for interfacing with processor modules of a plurality of different processor architectures comprising:

an interface for communicating with a processor module inserted at the motherboard; said interface receiving an identifier signal from the processor module on at least one identifier signal interconnect line, said identifier signal identifying the processor module architecture; and an architecture selection circuit for selectively exchanging processor architecture specific signals with the processor module based on the identifier signal, wherein the architecture selection circuit comprises a demultiplexer bank for inputting one of a plurality of processor architecture specific signals from the interface selected by the identifier signal.

20. The system of claim 19 wherein the interface comprises a connector for exchanging signals between the motherboard and processor module.

21. The system of claim 19 wherein the interface further communicates processor architecture specific signals and processor architecture common signals.

22. The system of claim 19 wherein the system further comprises an initialization memory bank comprising processor architecture specific data stored in memory, said data being selected based on the identifier signal.

23. The system of claim 19 wherein the memory comprises processor architecture specific BIOS ROM.

24. The system of claim 22 wherein the processor architecture specific data is transferred to the processor module via processor common signals on said interface.

* * * * *

UNITED STATES PATENT AND TRADEMARK OFFICE
CERTIFICATE OF CORRECTION

PATENT NO.    : 6,516,373 B1  Page 1 of 1
DATED         : February 4, 2003
INVENTOR(S)   : Gerald Talbot et al.

It is certified that error appears in the above-identified patent and that said Letters Patent is hereby corrected as shown below:

<u>Column 6,</u>
Line 41, delete "19" and insert -- 22 --.

Signed and Sealed this

Twenty-second Day of July, 2003

JAMES E. ROGAN
*Director of the United States Patent and Trademark Office*